(12) United States Patent
Lipka et al.

(10) Patent No.: US 7,199,997 B1
(45) Date of Patent: Apr. 3, 2007

(54) ASYMMETRIC ELECTROCHEMICAL SUPERCAPACITOR AND METHOD OF MANUFACTURE THEREOF

(75) Inventors: Stephen M. Lipka, Parkland, FL (US); John R. Miller, Shaker Heights, OH (US); Tongsan D. Xiao, Willington, CT (US); David E. Reisner, Bristol, CT (US)

(73) Assignee: U.S. Nanocorp, Inc., North Haven, CT (US)

( * ) Notice: Subject to any disclaimer, the term of this patent is extended or adjusted under 35 U.S.C. 154(b) by 405 days.

(21) Appl. No.: 09/590,496

(22) Filed: Jun. 9, 2000

(51) Int. Cl.
 *H01G 9/00* (2006.01)
(52) U.S. Cl. .................. 361/502; 361/504; 361/508; 361/512; 361/523
(58) Field of Classification Search ........ 361/502–504, 361/505, 517, 311, 519, 508–512, 523–534; 429/107, 242, 162, 163, 178, 211, 192; 29/25.03, 29/25.01
See application file for complete search history.

(56) References Cited

U.S. PATENT DOCUMENTS

| 4,313,084 | A |   | 1/1982  | Hosokawa et al. |         |
|-----------|---|---|---------|-----------------|---------|
| 4,697,224 | A |   | 9/1987  | Watanabe et al. |         |
| 4,820,599 | A | * | 4/1989  | Furukawa et al. | 429/194 |
| 5,077,150 | A | * | 12/1991 | Yoneda          | 429/162 |
| 5,085,955 | A |   | 2/1992  | Cipriano        | 429/197 |
| 5,244,757 | A | * | 9/1993  | Takami et al.   | 429/194 |
| 5,279,910 | A | * | 1/1994  | Sasaki et al.   | 429/213 |
| 5,322,746 | A |   | 6/1994  | Wainwright      | 429/60  |
| 5,362,579 | A | * | 11/1994 | Rossoll et al.  | 429/162 |
| 5,392,191 | A |   | 2/1995  | Thomas et al.   |         |
| 5,415,959 | A | * | 5/1995  | Pyszczek et al. | 429/249 |
| 5,419,977 | A | * | 5/1995  | Weiss et al.    | 429/7   |
| 5,478,670 | A | * | 12/1995 | Hayasaka et al. | 429/175 |
| 5,599,644 | A |   | 2/1997  | Swierbut et al. |         |
| 5,661,628 | A | * | 8/1997  | Yamagami        | 361/275.4 |
| 5,713,561 | A |   | 2/1998  | Sugiyama        |         |
| 5,902,696 | A | * | 5/1999  | Smesko et al.   | 429/142 |
| 5,923,525 | A |   | 7/1999  | Belyakov et al. |         |
| 5,953,204 | A | * | 9/1999  | Suhara et al.   | 361/502 |
| 5,961,887 | A |   | 10/1999 | Zheng et al.    |         |

(Continued)

OTHER PUBLICATIONS

Lipka, S. M, Application of Carbon Fiber Materials for Double Layer Capacitors,(Presented at 3rd International Seminar as Double Layer Capacitors and Similar Energy Storage Devices, Dec. 6-8, 1993, Deerfield Beach, FL).

(Continued)

*Primary Examiner*—Nguyen T. Ha
(74) *Attorney, Agent, or Firm*—Cantor Colburn LLP (57) ABSTRACT

An asymmetric supercapacitor has a positive electrode having a current collector an active material selected from the group consisting of manganese dioxide, silver oxide, iron sulfide and mixtures thereof, a negative electrode having a carbonaceous active material carbon and optional current collector, an electrolyte, and a separator plate. In a preferred embodiment at least one of the electrodes has nanostructured/nanofibrous material and in a more preferred embodiment, both electrodes have nanostructured/nanfibrous material. The electrolyte can be liquid or solid although liquid electrolytes are preferred.

The asymmetric supercapacitor has improved energy density by electrically coupling an electrode of high faradaic capacity such as one having manganese oxide ($MnO_2$) with an electrode such as carbon that stores charge through charge separation at the electric double-layer. The asymmetric supercapacitor also improves power density by using high surface area nanostructured/nanofibrous electrode materials.

22 Claims, 5 Drawing Sheets

U.S. PATENT DOCUMENTS

| | | | |
|---|---|---|---|
| 5,963,417 | A | 10/1999 | Anderson et al. |
| 5,986,876 | A | 11/1999 | Stepanov et al. |
| 5,986,878 | A | 11/1999 | Li et al. |
| 6,031,711 | A * | 2/2000 | Tennent et al. ............. 361/303 |
| 6,036,774 | A | 3/2000 | Lieber et al. |
| 6,048,645 | A * | 4/2000 | Saidi et al. ................. 429/231 |
| 6,097,587 | A * | 8/2000 | Inagawa ..................... 361/502 |
| 6,162,530 | A | 12/2000 | Xiao et al. |
| 6,198,623 | B1 * | 3/2001 | Amatucci ................... 361/512 |
| 6,222,723 | B1 | 4/2001 | Razoumov et al. |
| 6,410,181 | B1 * | 6/2002 | Spillman et al. ............ 429/101 |
| 6,519,135 | B2 * | 2/2003 | Sano et al. ................. 361/510 |
| 6,665,172 | B1 * | 12/2003 | Kim et al. .................. 361/523 |

OTHER PUBLICATIONS

Beliakov, A. I., et al., Development and Application of Combined Capacitors: Double Electric Layer—Pseudocapacity, (Presented to The 7th International Seminar on Double Layer Capacitors and Similar Energy Storage Devices, Dec. 8-11, 1997, Deerfield Beach, FL).

Varakin, I. N., et al., Nickel-plated fiber electrodes for batteries and electrochemical capacitors, (Presented at The 16th International Seminar & Exhibit on Primary & Secondary Batteries, Mar. 1-4, 1999, Fort Lauderdale, FL).

Varakin, I. N., et al., Application of Ultracapacitors as Traction Energy Sources, (Presented at The 7th International Seminar on Double Layer Capacitors and Similar Energy Storage Devices, Dec. 8-10, 1997, Deerfield Beach, FL).

Varakin, I. N., et al, Power Characteristics of "ESMA" Capacitors, (Presented to The 9th International Seminar on Double Layer Capacitors and Similar Storage Devices, Dec. 6-8, 1999, Deerfield Beach, FL).

Beliakov, Alexey I., et al, Power Performances of High Energy Density Capacitors on System Carbon/Nickel Oxide, (Presented at The 9th International Seminar on Double Layer Capacitors and Similar Energy Storage Devices, Dec. 6-8, 1999, Deerfield Beach, FL).

* cited by examiner

ASYMMETRIC ELECTROCHEMICAL SUPERCAPACITOR AND METHOD OF MANUFACTURE THEREOF

STATEMENT OF GOVERNMENT INTEREST

This invention was made with Government support under contract NAS 3-99054 awarded by the National Aeronautics and Space Administration. The Government has certain rights in the invention.

FIELD OF THE INVENTION

The present invention relates to electrochemical capacitors. In particular, the present invention relates to asymmetric electrochemical capacitors and methods to improve their energy density and power density.

BRIEF DESCRIPTION OF THE RELATED ART

Electrochemical capacitors (ECs) can store several hundred times more energy per unit weight (gravimetric energy density) and volume (volumetric energy density) than traditional electrolytic capacitors. Hereinafter energy density refers to both gravimetric and volumetric energy density. Additional advantages of ECs include high cycle life (>300k), high discharge rates (from minutes to milliseconds), safety tolerance to high rate charge, discharge, and overcharge, wide operating temperatures and good state-of-charge indication during charge and discharge. In many cases ECs can exceed the performance of batteries in applications requiring high power density and discharge rates that are in the minutes to seconds range, such as those encountered in pulse discharge applications.

Applications for asymmetric electrochemical capacitors include memory backup devices for computers, digital-clock backup in appliances and military electronics, defibrillators, power supplies (UPS), portable electronics, telephone communication systems, portable x-ray unit power sources, and remote telemetry power sources. Automotive applications include load-leveling in electric vehicles to extend the life of the battery, and to provide power for acceleration, automobile starting, lighting and ignition (SLI), automotive power steering, preheating catalytic converters, and pulse power needs such as power door locks and power windows.

Electrochemical double layer capacitors, also known as supercapacitors, store energy by the charging of the electrode/electrolyte interface (double layer capacitance) or through faradaic reactions (pseudo-capacitance) occurring at or near the electrode surface. The active materials presently under investigation as electrode materials for these devices include activated carbons (typically having surface areas in the range of 1000–3000 $m^2$/g), mixed metal oxides (e.g. ruthenium oxide and iridium oxide) and doped conductive polymers such as polypyrrole and polyaniline. Both aqueous and non-aqueous electrolytes have been used.

Symmetric supercapacitors employ materials having approximately the same level of response to an applied voltage for both electrodes whereas asymmetric supercapacitors utilize two different materials, each having a differing magnitude of response to an applied voltage, for the electrodes. Alternatively symmetric supercapacitors can be described as those employing the same mechanism of energy storage at both electrodes and asymmetric supercapacitors can be described as those employing different mechanisms of energy storage at each electrode. Mechanisms of energy storage include charge separation and faradaic processes (electron transfer).

Supercapacitors possess very high power densities, but low energy densities when compared to batteries. Various approaches have been investigated to increase the energy density of supercapacitors without affecting the high power performance. One approach has been to use non-aqueous electrolytes to increase the operating voltage of the supercapacitor and thus the stored energy. Operating voltages of commercial supercapacitors such as those developed by Panasonic having non-aqueous electrolytes are at values of up to 2.5 volts (V).

A second approach for increasing the energy density of supercapacitors has been to use conducting-polymer electrodes, for instance fluorophenyl thiophene, in both electrodes. These systems operate at approximately 2.8 V. At its present state of development, energy density projections for practical devices are in the range from 6–10 Watt*hours/kilogram (Wh/kg) at power levels of about 2 kilowatts/kilogram (kW/kg), but long-term stability and cycle life remain unclear. This approach requires use of very high purity materials and processes due to the high cell operating voltage, thus adding to the supercapacitor cost.

A third approach for increasing supercapacitor energy density has been to use pseudo-capacitor electrode materials, for example, mixed-oxide systems based on ruthenium oxide and iridium oxide. Generally, most pseudo-capacitor materials require an aqueous electrolyte, which limits cell voltages to about 1.2 V. The increased energy density in these systems is not due to the higher voltage, but rather use of pseudo-capacitive and double layer charge storage on high-surface-area electrodes. Significant (two-fold) energy density increases have been reported recently through the use of hydrated ruthenium oxide electrodes. This apparently allows bulk as well as surface charge storage. However, even with the doubling of energy density, ruthenium-based approaches are prohibitively expensive for automotive applications. For example, in a hybrid vehicle application, raw material costs alone for this approach are well in excess of $100,000.

Low-cost substitutes for the ruthenium-based system have been sought, for example oxides, nitrides, and sulfides of metals such as molybdenum and tungsten. Again, all of these materials require aqueous electrolytes for pseudo-capacitive charge storage. The operating voltage of such materials has been disappointingly low, in the range of 0.6 to 0.8 V for stable operation. This greatly reduces the materials' energy and power density. The materials also remain relatively high cost, especially compared to other supercapacitor materials such as activated carbon, which can offer comparable performance.

U.S. Pat. No. 5,986,876 discloses an asymmetric supercapacitor. In this design, a nickel oxyhydroxide (NiOOH) positive electrode is coupled with an activated carbon negative electrode and a potassium hydroxide (KOH) electrolyte. An asymmetric supercapacitor offers energy density advantages for several reasons. First, the device capacitance is almost equal to the capacitance of the electrode having the smallest capacitance, since $1/C_T=1/C_1+1/C_2$. This is because the other electrode is comprised of material having much higher specific capacity. In contrast, the capacity ratio for a symmetric supercapacitor is about 1, yielding a device capacitance about one-half that of each electrode. Secondly, because one electrode material has such high capacity, its mass and volume can be much smaller than the other electrode. The high-capacity electrode can thus have negligible mass or volume compared to the other electrode, which further increases the energy density of the asymmetric supercapacitor. Lastly, an asymmetric supercapacitor with aqueous electrolyte can reliably operate at voltages above 1.22 V without gas evolution. For example, known asymmetric supercapacitors can operate at 1.7 to 1.8 V, almost double that of commercially available symmetric aqueous supercapacitors. This higher voltage provides almost a fourfold increase in energy density. These three factors can combine to increase the energy density of an asymmetric supercapacitor to eight or more times that of a symmetric supercapacitor.

While the previously discussed improvements are significant, there nonetheless remains a need in the art for improved asymmetric supercapacitors having higher densities, high power performance and long life.

SUMMARY OF THE INVENTION

The above described drawbacks and disadvantages are overcome or alleviated by an asymmetric supercapacitor comprising a positive electrode comprising a current collector and an active material selected from the group consisting of manganese dioxide, silver oxide, iron sulfide and mixtures thereof, a negative electrode comprising a carbonaceous active material and optional current collector, an electrolyte, and a separator plate. In a preferred embodiment at least one of the electrodes comprises nanostructured/nanofibrous material and in a more preferred embodiment, both electrodes comprise nanostructured/nanofibrous material. The electrolyte can be liquid or solid although liquid electrolytes are preferred.

The asymmetric supercapacitor has improved energy density by electrically coupling a positive electrode of high faradaic capacity such as one comprising manganese dioxide ($MnO_2$) with a negative electrode that stores charge through charge separation at the electric double-layer such as one comprising carbon. The asymmetric supercapacitor also improves power density by using high surface area nanostructured electrode materials.

The asymmetric supercapacitor offers other practical advantages in addition to higher energy density. It is lower in cost, because one of the electrodes can comprise low-cost carbon. Voltage balance in a series-string of asymmetric cells should be less problematic than in symmetric cells because of the relatively constant voltage of each cell resulting from the high-capacity electrodes. Therefore, with no voltage de-rating as seen in symmetric cells, the maximum available energy and power densities along with the minimum possible cost can be realized in the system.

DETAILED DESCRIPTION OF THE PREFERRED EMBODIMENTS

An asymmetric supercapacitor comprises a positive electrode comprising a current collector and an active material selected from the group consisting of manganese dioxide, silver oxide, iron sulfide and mixtures thereof, a negative electrode comprising a carbonaceous active material and optional current collector, an electrolyte, and a separator plate. In a preferred embodiment at least one of the electrodes comprises nanostructured/nanofibrous material and in a more preferred embodiment, both electrodes comprise nanostructured/nanofibrous material. The electrolyte can be liquid or solid although liquid electrolytes are preferred. The asymmetric supercapacitor can be used either in bipolar or monopolar construction.

Figure 1:
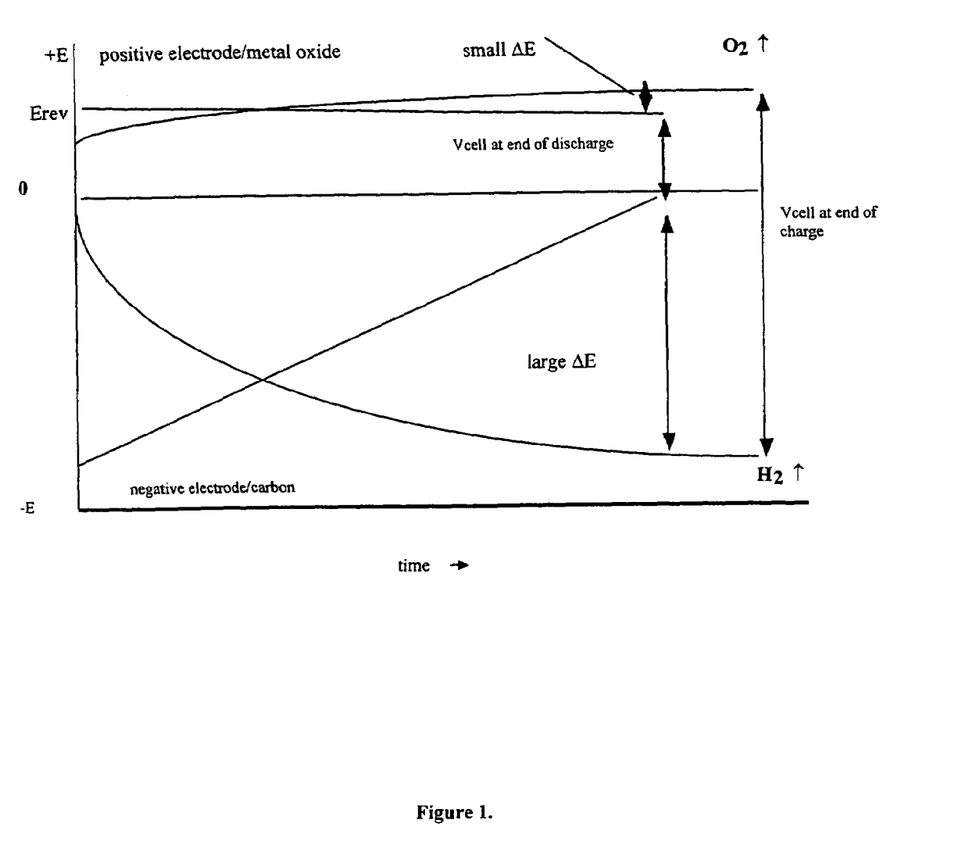
FIG. 1 is a schematic representation of the change in potential at each electrode during charge and discharge.

In order for the electrochemical couple, i.e. the positive and negative electrodes, to obtain high energy density, one of the electrodes, the positive electrode in the instant case, must have a low degree of polarization; the potential of the electrode changes little from its reversible potential during the passage of current. Additionally, non-faradaic processes must be minimized and faradaic processes (electron transfer) occur across the electrode surface at a high reaction rate. The opposite electrode, the negative electrode, should possess a high degree of polarizability and under ideal conditions, should develop a large window of potential change during charge and discharge. Charge storage at the polarizable electrode is through double-layer charge separation. To illustrate, the change in potential occurring at each electrode during charge and discharge is shown schematically in FIG. 1. As can be seen, a large voltage window is developed as the asymmetric supercapacitor is charged. For an asymmetric device containing aqueous electrolyte, the potential window can be limited by hydrogen and oxygen gas evolution at the electrodes. The potential of the electrode with a low degree of polarization remains essentially unchanged during both the charge and discharge processes.

The asymmetric supercapacitor offers other practical advantages in addition to higher energy density. It is lower in cost, because one of the electrodes can comprise low-cost carbon. Voltage balance in a series-string of asymmetric cells (monopolar construction) is less problematic than in symmetric cells because of the relatively constant voltage of each cell resulting from the high-capacity electrodes. With no voltage de-rating as seen in symmetric cells, the maximum available energy and power densities along with the minimum possible cost can be realized in the system.

Suitable active materials for the positive electrode include manganese dioxide, silver oxide, iron sulfide or mixtures thereof. Manganese dioxide is preferred. The active material is typically in particulate form, the particles of which have a mean single linear dimension of less than about 100 microns and is preferably nanostructured. The particular form of the active material will depend on the desired performance, cost and other characteristics of the asymmetric supercapacitor. It is contemplated that a wide variety of forms may be used, for example shapes both irregular and regular, such as amorphous, fibrous, spheroidal, rhomboidal and the like, bird's nest and the other forms described in U.S. application Ser. No. 08/971,817, now U.S. Pat. No. 6,162, 530, as well as nanorods disclosed in U.S. Pat. No. 6,036, 774 which is incorporated by reference herein. Synthesis and structure of suitable nanostructured sulfides, oxides and hydroxides is disclosed in U.S. Ser. No. 08/971,817, now U.S. Pat. No. 6,162,530, and U.S. Ser. No. 09/579,874, now U.S. Pat. No. 5,713,561, incorporated herein by reference. Nanostructured materials are well suited for use in electrodes because they have extremely high surface activity and high accessible surface area. This is in contrast to other high surface area materials in which much of the surface area is contained in deep micropores and thus is largely non-utilizable in capacitor applications. As used herein a nanostructured material refers to materials having a grain size on the order of 1 to 100 nanometers (where 1 nm=10 angstroms). Nanostructured materials are thus characterized by having a high fraction of the material's atoms residing at grain or particle boundaries. For example, with a grain size in the five nanometer range, about one-half of the atoms in a nanocrystalline or a nanophase solid reside at grain or particle interfaces.

Nanostructured metal oxides and hydroxides and sulfides may be produced by an aqueous chemical solution method comprising providing an aqueous starting solution and an aqueous reactant solution, at least one of which comprises at least one precursor metal salt; atomizing the reactant solution into the starting solution to provide a nanostructured powder.

The nanostructured powders may be aged or heat-treated for a length of time effective to transform the completely or partially or crystalline nanostructured powders into the desired crystalline state. This procedure is critical, since it serves to stabilize the nanocrystal structure. Process parameters, which affect the morphology and yield of the nanocrystalline powder product, include temperature of heating, time of heating, and solution pH.

After aging or heat-treating, the nanocrystalline powders are generally isolated by filtration and washed to remove by-products, preferably using deionized, distilled water or other suitable solvent.

The active material may be applied to the current collector by any method known in the art. One such method is known as pasting. The active material is mixed with a binder to form a slurry and then applied to the current collector. Examples of binders include, but are not limited to, PVDF and fibrillated PTFE. If the binder is a solid then it is first dissolved in a suitable solvent and then following application to the current collector the solvent is evaporated. The choice of binder is dependent upon the active material and the choice of solvent is dependent upon the choice of binder. The selection of binder and solvent are readily determined without undue experimentation by one of ordinary skill in the art.

Preferably the electrodes may be formed by thermal spraying onto the current collector. Thermal spray techniques are disclosed in U.S. application Ser. No. 09/485,424, now U.S. Pat. No. 5,599,644, which is herein incorporated by reference. A suspension of nanocrystalline particles is subjected to ultrasonication using an intense ultrasonic probe. Ultrasonication disintegrates any powder aggregates and introduces lattice defects into the nanocrystalline particles. These defects can exert an important influence on the performance of nickel hydroxide, for example, when it is used as the active material in a nickel electrode. Parameters, which affect the final product, include ultrasonic power and processing time.

The final step of thermal spray is generally spray-drying of the ultrasonicated nanoparticle suspension to produce nanoporous spherical powder agglomerates. This procedure produces agglomerates of nanostructured particles, wherein the agglomerates have diameters in the range from about 0.1 to 200 microns, preferably from about 1 to 100 microns, and most preferably about 20 microns. During spray-drying, rapid evaporation occurs as the spray droplets contact the hot air stream to produce a saturated vapor film. Continued evaporation depends on the diffusion rate of the moisture through the surface shell. As the shell thickness increases with time there is a corresponding decrease in the evaporation rate. Since evaporation is an endothermic process, the droplet surface remains cool until the evaporation is complete, even though the gas stream can be fairly hot. Use of aerosol spray-drying ensures that the end-product powder (i.e., $MnO_2$) is free of undesirable phases that might be produced by heating above 200° C. Relevant processing parameters include the precursor delivery rate, inlet and outlet gas temperature, and suspension concentration.

Useful positive electrode thicknesses are about 10 microns to about 250 microns. Preferably the positive electrode thickness is less than about 50 microns.

Suitable carbonaceous active materials for the negative electrode include carbon, functionalized carbon as disclosed in U.S. Pat. No. 6,031,711 which is incorporated by reference herein, and carbon composites, including carbon coated with metals and metal oxides such as ruthenium oxide. Carbon is preferred. The active material is particulate in nature with a mean particle radius of less than about 100 microns. The term particulate as used herein also includes fibers. The fibers can be loose (discrete) fibers, or in the form of a non-woven mat or a woven cloth. Also within the scope of the invention is a two dimensional sheet comprising a carbonized polymer. Useful fibers are less than about 10 microns in diameter. Nanofibrous materials, that are fibers with diameters less than 100 nm, are useful for use in electrodes due to their high surface area. Nanofibrous carbon with fiber diameters less than about 50 nm is contemplated to be more useful due to the higher surface area.

When the active material of the negative electrode comprises loose particulate material it may be applied to the optional current collector by any method known in the art including pasting, as described above, and casting. In casting, a slurry of active material with an optional binder is cast into a film. The resulting film is applied to the current collector, preferably with an adhesive. If the active material is in the form of a non-woven mat, woven cloth or two dimensional sheet the active material may be applied to the current collector or simply put in close contact with the current collector in the supercapacitor. If the active material is in a form that can stand alone, it may serve the dual purpose of active material and current collector. The carbon active material must be activated and activation can be achieved by any method known in the art. The resulting electrodes are porous, with a porosity of greater than about 80%. The porosity is especially important when employing liquid electrolytes as the pores allow for greater intimate contact between active material and electrolyte. Additionally, the electrode may be coated with a collection coating on the current collector side to improve current collection. The choice of coating is determined by the stability of the coating in conditions of the supercapacitor, especially with regard to corrosion by the electrolyte. For example, nickel coating is typically employed when potassium hydroxide is the electrolyte because nickel is relatively unaffected by the potassium hydroxide. Useful electrodes thicknesses are about 50 microns to about 375 microns.

Current collectors are well known in the art. They may comprise any conductive material with electrochemical stability in the supercapacitor environment. Examples of such materials include, but are not limited to, metal foil, metal mesh, electrically conductive polymers, electrically conductive polymer composites, and expanded metals. The current collector may be porous or non-porous as desired. The thickness of the current collector must be sufficient to provide current collection to all active material in the electrode uniformly and provide sufficient rate performance (i.e. sustain current performance). Current collectors generally have a thickness of about 10 microns to about 75 microns.

Electrolytes can be solid or liquid although liquid electrolytes are preferred. Examples of suitable solid electrolytes include polyacids such as isopolyacids and heteropolyacids as disclosed in U.S. Pat. No. 5,986,878 which is incorporated by reference herein. Liquid electrolytes can be aqueous or non-aqueous. Aqueous electrolytes can only sustain up to about 1–2 V of potential in the device before electrochemical decomposition of water occurs. This can be overcome by arranging individual capacitors in parallel or by using non-aqueous electrolytes, which can withstand up to 3–4 V of applied potential. It is also possible to modify the capacitance by adjusting the electrolyte concentration.

A suitable non-aqueous electrolyte is an organic or non-aqueous solvent containing an ion that can intercalate into the electrode surface. The ion can be an anion or cation, depending upon the active material of the electrode.

Other non-aqueous or organic electrolytes are also suitable if they meet the following criteria: (1) the applied potential at which the electrolyte decomposes ("breakdown voltage") is between 1 V and 10 V, (2) the conductivity of the electrolyte is sufficiently high to facilitate rapid electron transfer between electrodes, preferably in the range of 0.1 to 1000, preferably 0.1 to 500, milliSiemens/cm, and (3) the electrolyte has low or no ability to chelate the metal or to extract the metal from the thin film surface. The electrolyte should chelate or remove less than 5% and preferably less than 1% of the metal from the film surface.

Suitable aqueous electrolytes include aqueous solutions of hydroxides of alkali metals, carbonates of alkali metals, sulfuric acid or mixtures thereof. The electrolyte is chosen to match the composition of the electrodes so as to minimize the equivalent series resistance (ESR). Such a determination can be made without undue experimentation by one of ordinary skill in the art. When the positive electrode is $MnO_2$ and the negative electrode is activated carbon the preferred electrolyte is potassium hydroxide. The amount of electrolyte is determined by the size of the capacitor. The concentration of the electrolyte is concentration necessary to achieve maximum ionic conductivity at the operating temperature of the capacitor. The electrolyte concentration is typically about 25 weight percent (wt %) to about 45 wt %.

The separator comprises a thin, non-conductive, porous material. It can be composed of any material impervious to the conditions of the supercapacitor, namely exposure to electrical charge and electrolyte. Porosity is typically about 40% to about 87%. Preferably the porosity is about 65% to about 85%. Thickness is typically about 25 microns to about 75 microns. A preferred separator is CELGARD™ 3501 available from Hoechst Celanese Corp.

The asymmetric supercapacitor may be assembled from the above mentioned components in all ways known in the art. When the electrolyte is liquid the electrode materials must be soaked ("wet up") either before electrode construction or after electrode construction. The electrode material may undergo formation (activation) either prior to electrode construction, after electrode construction, or after supercapacitor assembly. When the electrolyte is solid it is disposed adjacent to the electrode. The electrode, electrolyte and current collector, when present, comprise a half cell. The separator is applied to one half cell and then the two half cells are mated and sealed, preferably by heat.

Figure 2:
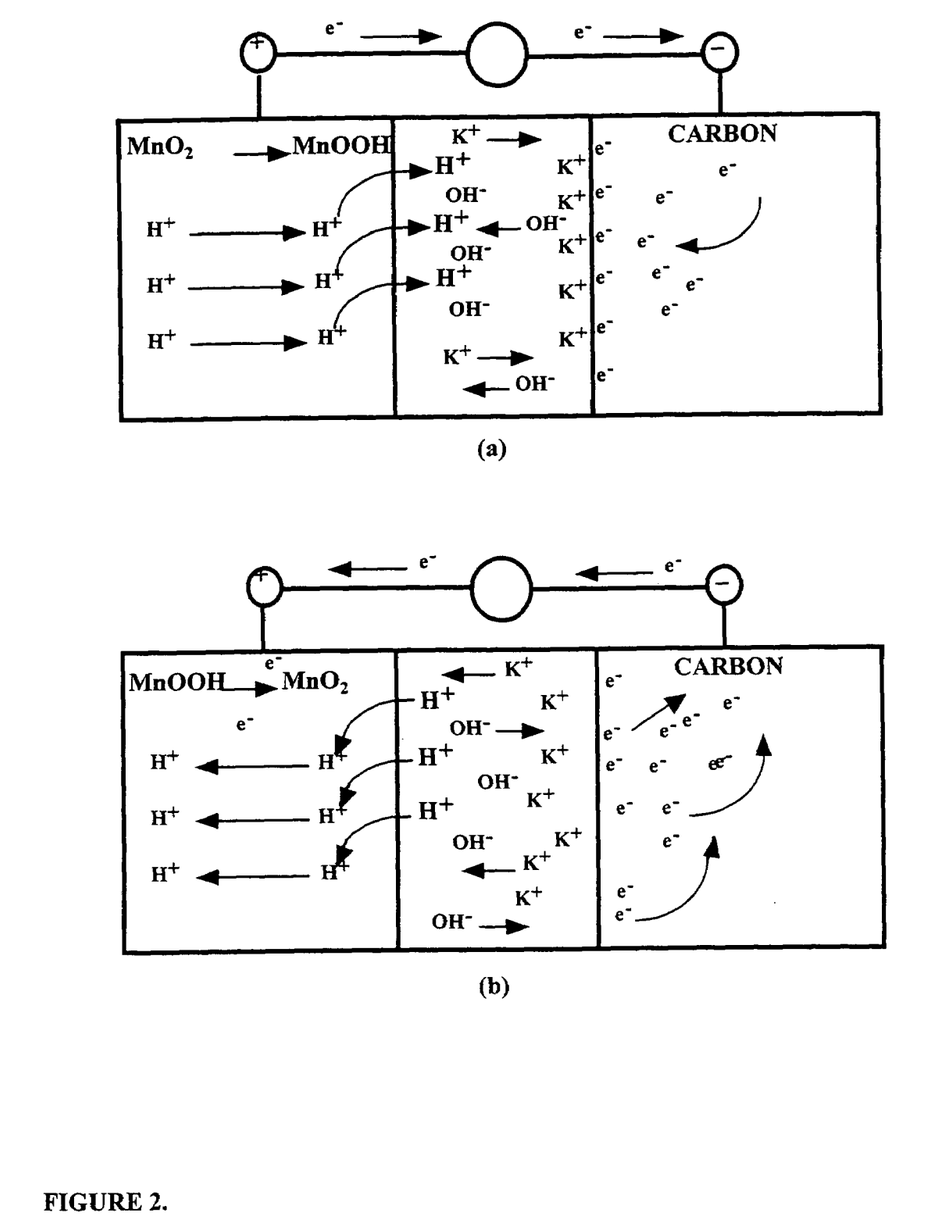
FIG. 2 is a schematic representation of the movement of ions during charge and discharge.

Without being bound by theory, it is expected that the general mechanism for the asymmetric capacitor is similar to that of its aqueous analog, with faradaic processes occurring at the manganese electrode and double-layer charging at the carbon electrode. This is illustrated in FIG. 2, which shows the movement of ions during charge and discharge of an asymmetric supercapacitor containing manganese and carbon in aqueous KOH. During charge, protons from the polarized manganese electrode are ejected and move into the electrolyte (deprotonization) while an electric double layer consisting of hydrated K ions forms on the carbon electrode. This process operates in reverse during discharge.

Figure 3:
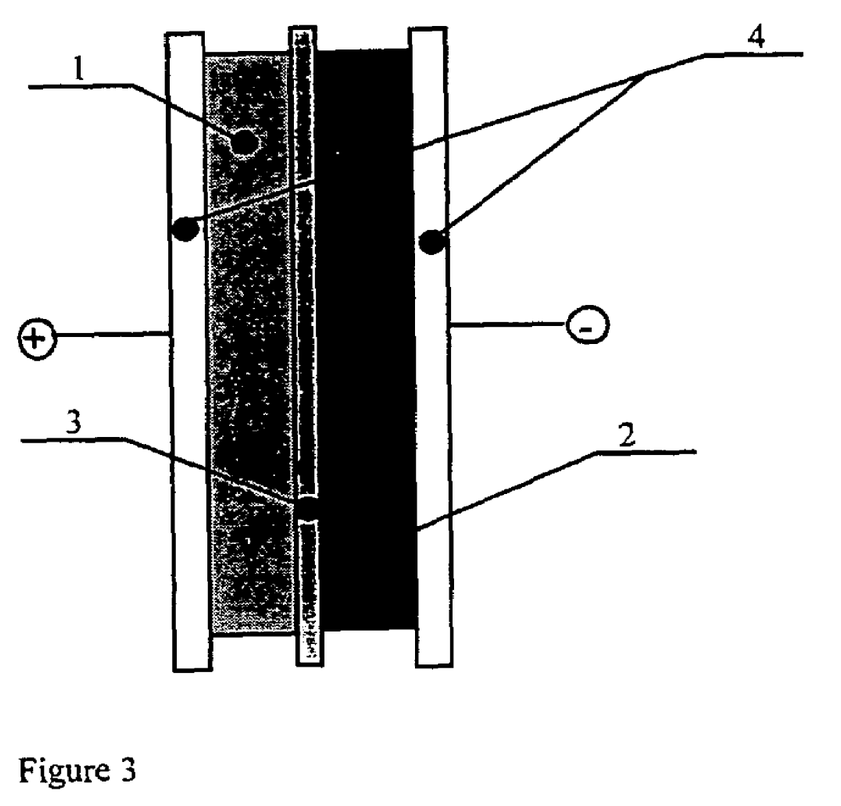
FIG. 3 is a schematic representation of an asymmetric supercapacitor.

FIG. 3 is a schematic representation of a supercapacitor. 1 is the active material for the positive electrode, 2 is the active material for the negative electrode, 3 is the separator and 4 are the current collectors. The electrolyte is dispersed throughout the separator and electrodes.

The invention is further illustrated by the following non-limiting examples.

EXAMPLES

Supercapacitors were assembled comprising two electrodes on either side of a separator. Both electrodes had a current collector on the side opposite to the separator. Each circular electrode was 0.031 cm thick and 1.9 cm in diameter. The electrolyte was 32 wt % KOH. The separator was Celgard™ 3501. The current collectors comprised carbon black loaded PVC sheet material that was 50 micrometers thick. The particulate carbon was a natural carbon with a 5 micrometer particle size. The nanofiborous carbon was carbon fibers with a diameter of less than 100 mm. The particulate $MnO_2$ was electrochemically formed material wherein the particles had a mean single linear dimension of less than 100 microns. The nanostructured $MnO_2$ had a grain size less than 100 nm. The carbon and $MnO_2$ were saturated with the electrolyte and then weighed. Table 1 shows the composition of each example as well as energy and capacitance data. Electrochemical impedance measurements were made on each example at 1.7 V for the asymmetric cells and 1.0 V for the symmetric cells. Device capacitance was measured at 2 mHz for all examples. Energy density (Wh/kg) calculations were based on the wet mass of the active materials only. Examples 6 and 7 are symmetric supercapacitors with two carbon electrodes and as such are comparative examples and outside the scope of the invention.

TABLE 1

| Example | Type of Carbon | Wet mass of Carbon (mg) | Type of $MnO_2$ | Wet mass of $MnO_2$ (mg) | Capacitance (F) | Energy (J) | Wh/kg |
|---|---|---|---|---|---|---|---|
| 1 | particulate | 100 | particulate | 165 | 5.1 | 7.4 | 7.7 |
| 2 | particulate | 100 | particulate | 125 | 3.9 | 5.7 | 7.0 |
| 3 | particulate | 100 | nanostructured | 175 | 5.4 | 7.8 | 7.9 |
| 4 | nanofibrous | 800 | particulate | 165 | 6.3 | 9.2 | 2.6 |
| 5 | nanofibrous | 800 | nanostructured | 210 | 7.5 | 10.8 | 3.0 |

TABLE 1-continued

| Example | Type of Carbon | Wet mass of Carbon (mg) | Type of $MnO_2$ | Wet mass of $MnO_2$ (mg) | Capacitance (F) | Energy (J) | Wh/kg |
|---|---|---|---|---|---|---|---|
| 6* | particulate | 200 | — | — | 2.4 | 1.2 | 1.7 |
| 7* | nanofibrous | 200 | — | — | 0.33 | 0.17 | 0.23 |

*Comparative examples

The data show that Examples 1–3, asymmetric capacitors combining $MnO_2$ with activated carbon have energy densities in excess of 7 Wh/kg, over 4 times that of the symmetric carbon/carbon device. The data also show that the capacitor containing the nanofibrous $MnO_2$ showed the highest energy density of all the devices.

Figure 4A:
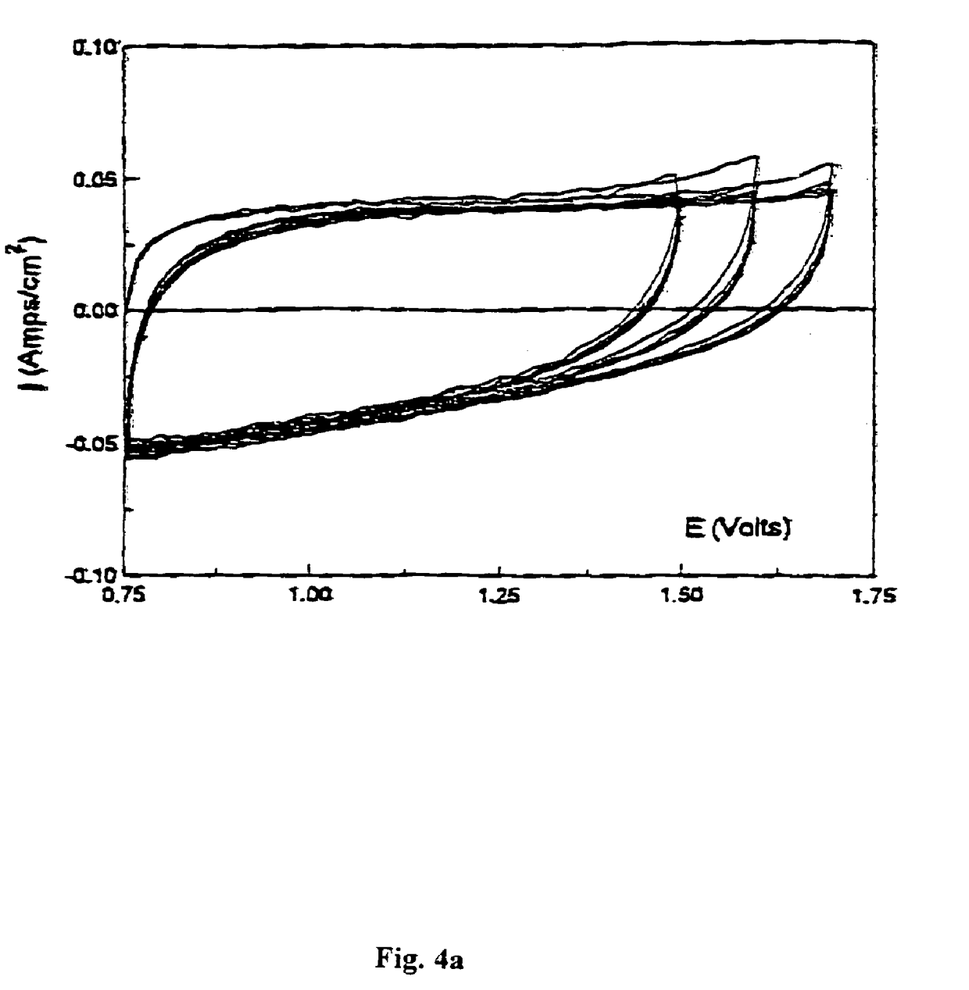
FIGS. 4a and b are cyclic voltammograms for Examples 1 and 4.
Figure 4B:
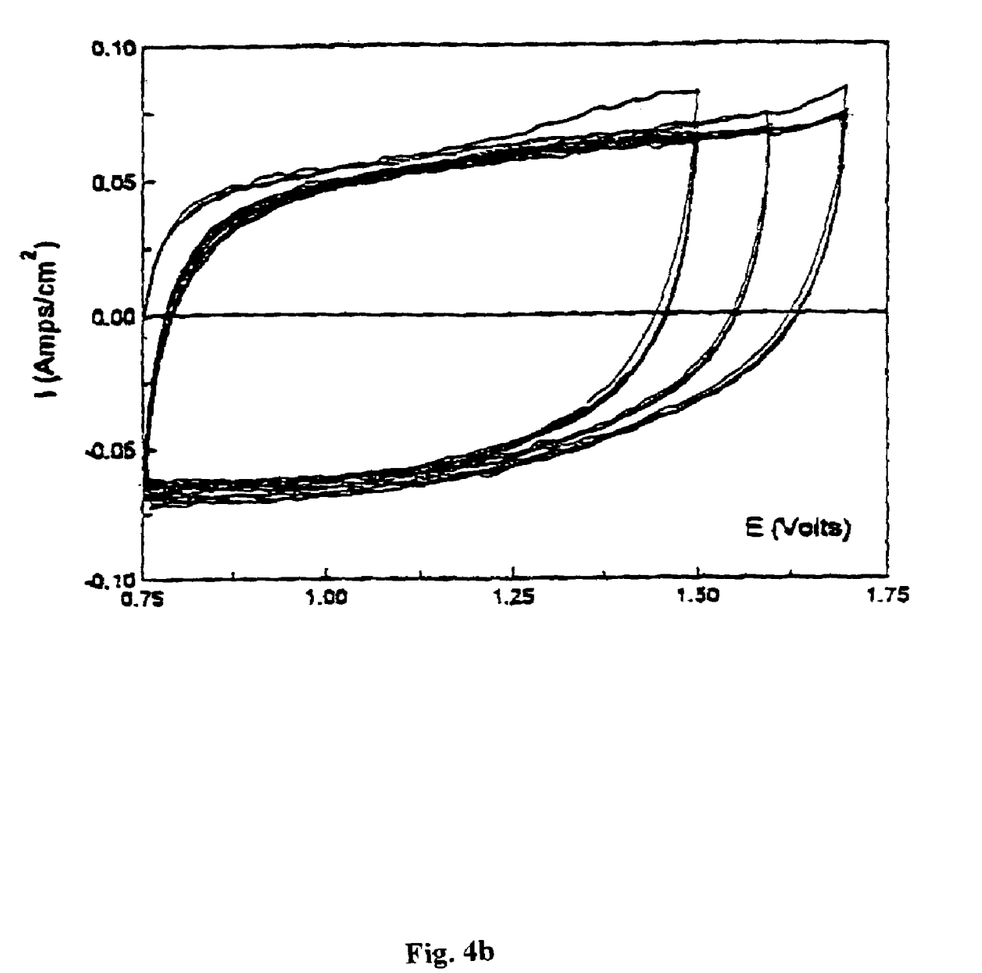

FIG. 4a is a cyclic voltammogram for Example 1 and FIG. 4b is a cyclic voltammogram for Example 5. Cyclic voltammograms were obtained by cycling the cell between 0.75–1.5 V, 0.75–1.6 V and 0.75–1.7 V at a sweep rate of 10 mV/s. The resulting voltammograms are presented show capacitive behavior of the examples over the entire voltage window. These data also show a large voltage window of stability for the electrochemical couple, over 2 V. Example 5 shows a more symmetric current behavior over the voltage window when compared to Example 1. Also, Example 5 showed a correspondingly larger capacitance than Example 1 as evidenced by an increase in the anodic and cathodic currents.

As can be seen by the foregoing description and examples the asymmetric supercapacitor described herein exhibits improved energy and power density when compared to asymmetric supercapacitor. Additionally the asymmetric supercapacitor provides the improved energy and power density in a cost effective manner.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An asymmetric supercapacitor comprising:
   a positive electrode comprising a current collector and an active material selected from the group consisting of manganese dioxide, silver oxide, iron sulfide and mixtures thereof;
   a negative electrode comprising carbonaceous active material;
   an aqueous electrolyte solution selected from the group consisting of aqueous solutions of hydroxides of alkali metals, aqueous solutions of carbonates of alkali metals, and mixtures thereof; and
   a separator plate.

2. The asymmetric supercapacitor of claim 1 wherein the negative electrode further comprises a current collector.

3. The asymmetric supercapacitor of claim 2 wherein the current collector is selected from the group consisting of metal foil, metal mesh, electrically conductive polymer composites and expanded metal.

4. The asymmetric supercapacitor of claim 1 wherein the carbonaceous active material comprises nanofibrous materials.

5. The asymmetric supercapacitor of claim 4 wherein the carbonaceous active material is discrete carbon fibers less than 10 microns in diameter.

6. The asymmetric supercapacitor of claim 5 wherein the carbonaceous active material is carbon fibers less than 100 nm in diameter.

7. The asymmetric supercapacitor of claim 6 wherein the carbonaceous active material is carbon fibers less than 50 nm in diameter.

8. The asymmetric supercapacitor of claim 1 wherein the negative electrode has a thickness about 50 microns to about 375 microns.

9. The asymmetric supercapacitor of claim 1 wherein the carbonaceous active material is non-woven mat, woven cloth or two dimensional sheet comprising carbonized polymer.

10. The asymmetric supercapacitor of claim 1 wherein the negative electrode further comprises a collection coating.

11. The asymmetric supercapacitor of claim 1 wherein the positive electrode active material comprises manganese dioxide.

12. The asymmetric supercapacitor of claim 11 wherein the manganese dioxide is nanostructured.

13. The asymmetric supercapacitor of claim 1 wherein the positive electrode active material is nanostructured.

14. The asymmetric supercapacitor of claim 1 wherein the active material is applied to the current collector by thermal spray.

15. The asymmetric supercapacitor of claim 1 wherein the positive electrode further comprises a binder.

16. The asymmetric supercapacitor of claim 1 wherein the current collector is selected from the group consisting of metal foil, metal mesh, electrically conductive polymer composites and expanded metal.

17. The asymmetric supercapacitor of claim 1 wherein the positive electrode thickness is less than about 250 microns.

18. The asymmetric supercapacitor of claim 17 wherein the positive electrode thickness is less than about 50 microns.

19. An asymmetric supercapacitor comprising;
   a positive electrode comprising a current collector and manganese dioxide;
   a negative electrode comprising carbonaceous active material;
   an aqueous electrolyte solution selected from the group consisting of aqueous solutions of hydroxides of alkali metals, aqueous solutions of carbonates of alkali metals, and mixtures thereof; and a separator plate.

20. The asymmetric supercapacitor of claim 19 wherein the carbonaceous active material is nanofibrous.

21. The asymmetric supercapacitor of claim 19 wherein the manganese dioxide is nanostructured.

22. The asymmetric supercapacitor of claim 19 wherein the carbonaceous active material is nanofibrous and the manganese dioxide is nanostructured.

* * * * *